(No Model.)

T. W. FISHER.
BREAST COLLAR.

No. 449,471. Patented Mar. 31, 1891.

WITNESSES:
H. Walker
C. Sedgwick

INVENTOR:
T. W. Fisher
BY Munn & Co
ATTORNEYS

UNITED STATES PATENT OFFICE.

THOMAS WHITE FISHER, OF HELENA, MONTANA, ASSIGNOR OF ONE-HALF TO JACOB J. LEISER, OF SAME PLACE.

BREAST-COLLAR.

SPECIFICATION forming part of Letters Patent No. 449,471, dated March 31, 1891.

Application filed September 23, 1890. Serial No. 365,870. (No model.)

*To all whom it may concern:*

Be it known that I, THOMAS WHITE FISHER, of Helena, in the county of Lewis and Clarke and State of Montana, have invented a new and Improved Breast-Collar, of which the following is a full, clear, and exact description.

This invention relates to an improvement in the construction of breast-collars for the harness of draft-animals, and has for its object to provide a device of the genus named which will avoid constriction upon the windpipe and blood-conduits in the animal's neck, that will transfer load strain to the shoulders of the horse, and, furthermore, furnish means for the quick application and removal of the breast-collar and attached harness upon or from a draft-animal.

To these ends my invention consists in the construction and combination of parts, as is hereinafter described and claimed.

Reference is to be had to the accompanying drawings, forming a part of this specification, in which similar letters of reference indicate corresponding parts in all the figures.

Figure 1:
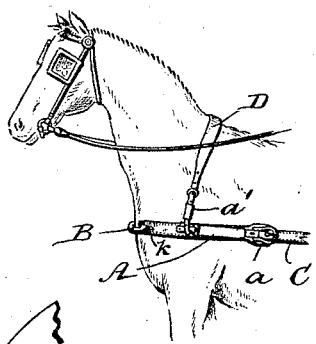
Figure 2:
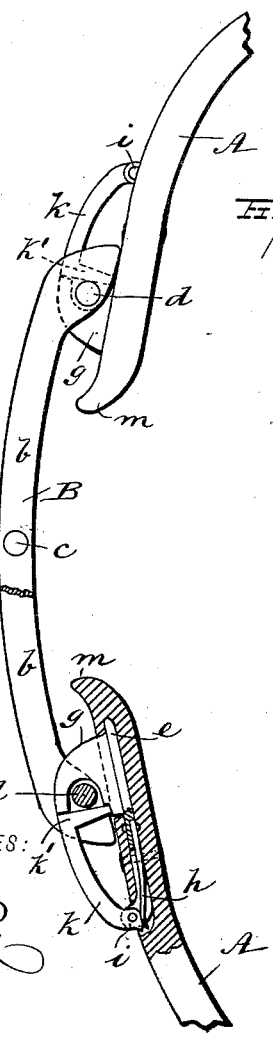
Figure 3:
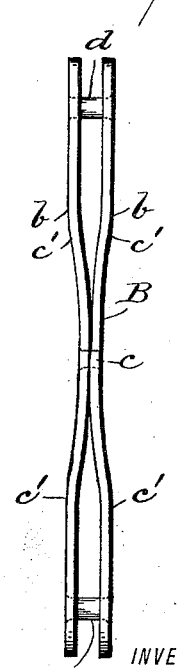

Figure 1 is a side view of the breast-collar in position upon a horse and a trace-strap broken, which is attached to the collar. Fig. 2 is an enlarged edge view of the breast-collar, partly in section and broken; and Fig. 3 is a front edge view of a link-bar that forms a part of the breast-collar.

The breast-collar consists of two similar straps A, which are of a length proportioned to the size of the draft-animal on which they are to be used. Said straps or collar-sections, being removably connected to an intervening link-bar B at their forward ends, as will be further explained, are rearwardly extended to be adjustably connected to the forward ends of the traces C, as shown at $a$ in Fig. 1.

At a proper point between the ends of the collar-sections A the depending ends of the shoulder-strap D are adjustably secured by any suitable means, the strap D being made adjustable for length near each of its ends $a'$ to enable the same to be adapted for a proper support of the breast-collar sections with regard to the proportions of the animal on which the collar is placed.

The link-bar B is preferably made of two similar plates $b$, of steel or other suitable metal, which plates are curved edgewise a proper degree, having their edges substantially parallel and their terminal ends widened and tapered to give them an arrow-head form.

As shown in Fig. 3, the plates $b$ of the link-bar B are secured together at or near their longitudinal center C, and at the points $c'$ are outwardly bent and then forwardly extended in parallel planes, a sufficient space intervening between the end portions of the plates $b$ to afford room for the transverse cylindrical coupling-pins $d$, that are secured to the plates and between them at a proper distance from their free ends.

On the forward end portions of the collar-sections A elongated recesses are produced in the material for the introduction of the latch-frames $e$, which are of like form, and are embedded in the recesses mentioned and therein secured by rivets or other reliable fastening. At the forward ends of the latch-frames $e$ upwardly and rearwardly bent lugs $g$ are formed thereon, the conformation of which lugs adapts them to have a hooked engagement with the transverse pins $d$ on the link-bar B, and to facilitate such an engagement of parts the arrow-head portions on the ends of the link-bar are bent edgewise in the same direction on the concave side of the laterally-curved bar B, whereby the pins $d$ will be so located as to permit them to be entered readily within the transverse grooves produced in the hook-shaped lugs $g$, as shown in Fig. 2. The lower side of the latch-frames $e$ are similarly channeled from the lug $g$ toward their opposite ends for the introduction and resilient vibration of the flat finger-springs $h$, which have one end of each secured to the latch-frames near the lugs $g$. At the ends of the latch-frames $e$ toward which the free ends of the finger-springs $h$ are projected there are pairs of parallel ears $i$, formed on said frames, which ears are turned up from the frames sufficiently to permit the insertion between each pair of ears of a latch-dog $k$, one end of each dog being pivoted to the adjacent ears.

The latch-dogs $k$ are alike in form, and are each made of such a proportionate length as will permit their forward depending ends $k'$ to lie in loose contact with the grooved sides of the lugs $g$, the bodies of the dogs being upwardly and forwardly curved from their points of pivotal engagement with the ears $i$ to permit such an engagement of their forward ends.

The ends of the latch-dogs $k$, which are pivoted between the pairs of parallel ears $i$, are flattened to form seats for the impinging contact of the free ends of the springs $h$, said springs by their action holding the opposite ends of the latch-dogs depressed.

In service the curvature given to the link-bar B and form of its ends project the bar away from the neck of the horse or other draft-animal on which the breast-collar is applied, and thus relieves the animal from any constriction which would otherwise be produced by a pressure of the transvese collar-band.

The peculiar manner of connecting the link-bar B with the collar-sections A permits the collar and other parts of the harness to be quickly removed by an upward rocking movement of one of the latch-dogs $k$ on either side of the collar, said dogs when depressed forming a secure lock that prevents the displacement of the link-bar pins $d$ from the hook-lugs $g$.

Preferably the forward ends $m$ of the collar-sections A are bent outwardly, as shown in Fig. 2, thus avoiding an objectionable engagement of sharp corners with the breast of the animal when in service.

It is evident that from the construction of the improved breast-collar herein described the operation of applying the harness of which said collar is a portion will be greatly facilitated, and the known advantages of this type of a draft-collar secured also.

Having thus described my invention, what I claim as new, and desire to secure by Letters Patent, is—

1. The combination, with two breast-collar sections which are attached to traces by their rear ends and a supporting shoulder-strap, of a link-bar which is curved edgewise, bifurcated at its ends, and provided with transverse pins between the parallel end walls of the link-bar, and two similar latching devices that are adapted to detachably engage the transverse pins of the link-bar, substantially as set forth.

2. The combination, with two breast-collar sections and a link-bar that is curved edgewise and has forked ends that are provided with transverse pins, of two similar latching devices, each comprised of a frame, an integral hook-shaped lug, a latch-dog pivoted on the frame and adapted to rock and engage the lug, and a finger-spring which holds the dog in engagement with the hook-shaped lug, substantially as set forth.

THOMAS WHITE FISHER.

Witnesses:
D. M. SUTTON,
W. E. FREDERICK.